UNITED STATES PATENT OFFICE.

ASAHEL K. EATON, OF BROOKLYN, NEW YORK.

IMPROVEMENT IN COMPOUNDS OF GELATINE, TANNIN, AND CELLULOSE.

Specification forming part of Letters Patent No. 129,217, dated July 16, 1872.

*To all whom it may concern:*

Be it known that I, ASAHEL K. EATON, of Brooklyn, in the county of Kings and State of New York, have discovered a new and useful compound not known or used before; and I do hereby declare the following to be such a full, clear, and exact description of the same as will enable any one skilled in the art to which my invention most nearly appertains to make and use the same.

In the practice of chemistry I have discovered that cellulose—of all organic substances the most difficultly soluble—is readily dissolved in tanno-gelatine. Neither tannin nor gelatine has by itself the slightest soluble effect upon cellulose, but when the three are brought properly in contact they combine, forming an elastic gummy mass, which becomes hard like horn when thoroughly dried. The cellulose, whether in the form of ordinary paper pulp or that of raw cotton, entirely disappears, and forms with the tannin and gelatine a homogeneous compound, quite insoluble in water, and possessed of properties that adapt it to many uses of the greatest importance, such as the uses to which hard vulcanized caoutchouc is applied. It can be pressed in dies into shapes useful and ornamental, and can be incorporated in fabrics of cotton and other material to make them impervious to water. Combined with various coloring matters it may be made to imitate marble or other variegated ornamental stone.

In making this new compound I proceed as follows: Take gelatine in the form of ordinary glue, (the cheapest quality answering the purpose,) dissolve it in water in the usual way, and add the cellulose thereto, thoroughly mixing the two together. Then add the solution of tannin and boil the whole a short time over a slow fire, continually stirring the mass until the dissolution of the cellulose is completed. If only the pure compound is required the following would be the proper proportions: Glue, fifty-four parts; tannin, forty-five parts; cellulose, fifty parts; but it is found in practice that an excess of cellulose makes a much better article than the pure compound. Therefore I prefer for most purposes the following proportions: Glue, fifty-four parts; tannin, forty-six parts; and cellulose, one hundred and fifty parts. The tannin can be in the form of catechu, or any of the crude tannin gums can be used.

Articles made of this compound possess the properties of lightness, strength, and elasticity in a high degree.

Starch, which in its chemical composition is isomeric with cellulose, may be substituted for it, and a similar homogeneous compound is produced that is insoluble like the other, and quite similar in its properties generally; but an excess of starch, as in the case of cellulose, must not be used.

Having now described the nature and some of the uses of my discovery, I claim as new herein and desire to secure by Letters Patent—

The new composition of matter sulting from the chemical union of cellulose, tannin, and gelatine, or their respective equivalents.

A. K. EATON.

Witnesses:
AMOS BROADNAX,
P. D. KENNY.